(12) United States Patent
Steinmetz

(10) Patent No.: US 12,000,922 B2
(45) Date of Patent: Jun. 4, 2024

(54) DETERMINATION OF CARDINAL DIRECTION

(71) Applicant: Elta Systems Ltd., Ashdod (IL)

(72) Inventor: Josef Steinmetz, Givat Shmuel (IL)

(73) Assignee: ELTA SYSTEMS LTD., Ashdod (IL)

( * ) Notice: Subject to any disclaimer, the term of this patent is extended or adjusted under 35 U.S.C. 154(b) by 195 days.

(21) Appl. No.: 17/342,273

(22) Filed: Jun. 8, 2021

(65) Prior Publication Data

US 2021/0382161 A1   Dec. 9, 2021

(30) Foreign Application Priority Data

Jun. 8, 2020 (IL) ............................................ 275234

(51) Int. Cl.
| | | |
|---|---|---|
| G01S 13/42 | (2006.01) | |
| G01S 13/86 | (2006.01) | |
| G01S 13/88 | (2006.01) | |

(52) U.S. Cl.
CPC ............ *G01S 13/42* (2013.01); *G01S 13/867* (2013.01); *G01S 13/88* (2013.01)

(58) Field of Classification Search
CPC ......... G01S 13/42; G01S 13/867; G01S 13/88
See application file for complete search history.

(56) References Cited

U.S. PATENT DOCUMENTS 4,489,322 A * 12/1984 Zulch .................... G01S 13/867
                                                      342/149
7,451,059 B2   11/2008 Malchi et al.
2017/0168481 A1*  6/2017 Flanigan ............... G05D 1/0016
2017/0358864 A1* 12/2017 Arias ....................... H01Q 1/28
2018/0113472 A1*  4/2018 Sakr ..................... G05D 1/0276
2018/0115065 A1*  4/2018 Valdes Garcia ....... H04B 17/12

FOREIGN PATENT DOCUMENTS

| JP | H1068773 A1 | 3/1998 |
| JP | 2001/056368 A | 12/2001 |
| JP | 2019045341 A1 | 3/2019 |
| RU | 2604004 C1 | 7/2019 |
| RU | 2693936 C1 | 7/2019 |

OTHER PUBLICATIONS

Manchuk, John G., Conversion of Latitude and Longitude to UTM Coordinates, Paper 410, CCG Annual Report 11, 2009, pp. 410-1-410-4.

* cited by examiner

*Primary Examiner* — Peter M Bythrow
*Assistant Examiner* — Nazra Nur Waheed
(74) *Attorney, Agent, or Firm* — BROWDY AND NEIMARK, P.L.L.C.

(57) ABSTRACT

A method including:
  detecting that an aerial vehicle is located at a reference axis of a sensor, or at a predetermined or calculated angle of the reference axis of the sensor, the method further comprising, by a processor and memory circuitry:
  obtaining a given position $P_{aerial}$ of the aerial vehicle upon its detection at the reference axis of the sensor, or upon its detection at the predetermined or calculated angle of the reference axis of the sensor, and position $P_{sensor}$ of the sensor, and
  determining, based at least on $P_{aerial}$ and $P_{sensor}$, a cardinal direction with respect to the reference axis.

21 Claims, 11 Drawing Sheets

DETERMINATION OF CARDINAL DIRECTION

TECHNICAL FIELD AND BACKGROUND

The presently disclosed subject matter relates to the field of target detection.

GENERAL DESCRIPTION

In accordance with certain aspects of the presently disclosed subject matter, there is provided a method including detecting that an aerial vehicle is located at a reference axis of a sensor, or at a predetermined or calculated angle of the reference axis of the sensor, the method further comprising, by a processor and memory circuitry, obtaining a position $P_{aerial}$ of the aerial vehicle upon its detection at the reference axis of the sensor, or upon its detection at the predetermined or calculated angle of the reference axis of the sensor, and position $P_{sensor}$ of the sensor, and determining, based at least on $P_{aerial}$ and $P_{sensor}$, a cardinal direction with respect to the reference axis.

In addition to the above features, the method according to this aspect of the presently disclosed subject matter can optionally comprise one or more of features (i) to (xv) below, in any technically possible combination or permutation:

i. the cardinal direction is a north direction;
ii. the method comprises obtaining a vector $V'_1$ joining $P_{aerial}$ and $P_{sensor}$, and expressed in UTM coordinates, determining an orientation $\alpha$ of UTM north with respect to $V'_1$, determining an orientation $\sigma$ of geographical north and with respect to $V'_1$, based on $\alpha$, thereby determining orientation of the geographical north with respect to the reference axis;
iii. the method includes converting $P_{aerial}$ and $P_{sensor}$ into UTM coordinates, and determining a vector $V'_1$ joining $P_{sensor}$ to $P_{aerial}$ in UTM coordinates;
iv. the method comprises detecting that the aerial vehicle is located at a reference axis of the sensor, or at a predetermined angle of the reference axis, with a camera having known spatial relationship relative to the sensor;
v. the method comprises obtaining a vector $V'_1$ joining $P_{aerial}$ and $P_{sensor}$ and expressed in UTM coordinates, determining an orientation $\alpha$ of UTM north with respect to $V'_1$, and determining an orientation $\sigma$ of geographical north with respect to $V'_1$, based on $\alpha$, thereby determining orientation of the geographical north with respect to the reference axis;
vi. the method comprises applying a correction to $\alpha$ or to $\sigma$ to compensate a deviation between a light of sight of the camera and the reference axis of the sensor;
vii. the sensor is a radar or an antenna, the method including obtaining at least one first received signal sensed by a first part of the radar or antenna, obtaining at least one second received signal sensed by a second part of the radar or antenna, and detecting that the aerial vehicle is located at the reference axis of the radar or antenna based on at least the first received signal and the second received signal.
viii. the method includes detecting that the aerial vehicle is located at the reference axis of the radar or antenna includes detecting an extremum of a function depending at least from the first received signal and the second received signal;
ix. the sensor is a radar or antenna, wherein the aerial vehicle is located in a blind zone of the radar or antenna and wherein a signal transmitted by the aerial vehicle is delayed to simulate a virtual position of the aerial vehicle out of the blind zone;
x. for a system including a plurality of sensors including at least one first sensor and at least one second sensor, the method includes detecting that an aerial vehicle is located at a first reference axis of the first sensor, or at a first predetermined or calculated angle of the first reference axis of the sensor, obtaining a position $P_{aerial}$ of the aerial vehicle upon its detection at the first reference axis of the first sensor, or at the first predetermined or calculated angle of the first reference axis of the first sensor, determining, at the position $P_{aerial}$ of the aerial vehicle, a deviation of the aerial vehicle with respect to the second reference axis of the second sensor, determining, based at least on $P_{aerial}$ and a position $P_{sensor,1}$ of the first sensor, a cardinal direction with respect to the first reference axis of the first sensor, determining, based at least on $P_{aerial}$, a position $P_{sensor,2}$ of the second sensor, and said deviation, the cardinal direction with respect to the second reference axis of the second sensor.
xi. the first sensor is an active sensor and the second sensor is a passive sensor;
xii. determination of the cardinal direction is obtainable without using an inertial system;
xiii. the aerial vehicle is a UAV or a drone;
xiv. the reference axis includes at least one of a broadside direction of the sensor, a boresight direction of the sensor, and a center phase of the sensor;
xv. the method includes determining, by the sensor, data $P_{t1}, \ldots P_{tN}$ informative of at least one of a relative angular position and a range of an aerial vehicle with respect to the sensor at different instants of time, the method further including, by a processor and memory circuitry, obtaining data $P'_{t1}, \ldots P'_{tN}$ informative of position of the aerial vehicle at the different instants of time, and determining Position of the sensor based at least on $P_{t1}, \ldots P_{tN}$ and $P'_{t1}, \ldots P'_{tN}$.

In accordance with certain aspects of the presently disclosed subject matter, there is provided a non-transitory computer readable medium comprising instructions that, when executed by a processor and memory circuitry, cause the processor and memory circuitry to perform operations as described above.

In accordance with certain aspects of the presently disclosed subject matter, there is provided a method including, determining, by a sensor, data. $P_{t1}, \ldots P_{tN}$ informative of at least one of a relative angular position and a range of an aerial vehicle with respect to the sensor at different instants of time, the method further including, by a processor and memory circuitry, obtaining data $P'_{t1}, \ldots P'_{tN}$ informative of position of the aerial vehicle at the different instants of time, and determining position of the sensor based at least on $P_{t1}, \ldots P_{tN}$ and $P'_{t1}, \ldots P'_{tN}$.

In accordance with certain aspects of the presently disclosed subject matter, there is provided a non-transitory computer readable medium comprising instructions that, when executed by a processor and memory circuitry, cause the processor and memory circuitry to perform operations as described above.

In accordance with certain aspects of the presently disclosed subject matter, there is provided a system including a processor and memory circuitry configured to obtain a position $P_{aerial}$ of an aerial vehicle upon its detection at a reference axis of a sensor, or upon its detection at a predetermined or calculated angle of the reference axis of the sensor, and determine, based at least on $P_{aerial}$ and a position $P_{sensor}$ of the sensor, a cardinal direction with respect to the reference axis of the sensor.

In addition to the above features, the system according to this aspect of the presently disclosed subject matter can optionally comprise one or more of features (xvi) to (xxx) below, in any technically possible combination or permutation:

xvi. the system includes the sensor, wherein the sensor is configured to detect that the aerial vehicle is located at its reference axis, or at a predetermined or calculated angle of its reference axis;

xvii. the cardinal direction is a north direction;

xviii. the system is configured to obtain a vector $V'_1$ joining $P_{aerial}$ and $P_{sensor}$ and expressed in UTM coordinates, determine an orientation $\alpha$ of UTM north with respect to $V'_1$, determine an orientation $\sigma$ of geographical north with respect to $V'_1$, based on $\alpha$, thereby determining orientation of the geographical north with respect to the reference axis;

xix. the system is configured to convert $P_{aerial}$ and $P_{sensor}$ into UTM coordinates, and determine a vector $V'_1$ joining $P_{sensor}$ to $P_{aerial}$ in UTM coordinates;

xx. the system comprises a camera having known spatial relationship relative to the sensor and usable to detect that the aerial vehicle is located at the reference axis of the sensor, or at a predetermined angle of the reference axis of the sensor;

xxi. the system is configured to obtain a vector $V'_1$ joining $P_{aerial}$ and $P_{sensor}$ and expressed in UTM coordinates, determine an orientation $\alpha$ of UTM north with respect to $V'_1$, determine an orientation $\sigma$ of geographical north with respect to $V'_1$, based on $\alpha$, thereby determining orientation of the geographical north with respect to the reference axis;

xxii. the system is configured to apply a correction to $\alpha$ or to $\sigma$ to compensate a tilt between a light of sight of the camera and the reference axis of the sensor;

xxiii. the sensor is a radar or an antenna configured to obtain at least one first received signal sensed by a first part of the radar or antenna, obtain at least one second received signal sensed by a second part of the radar or antenna, and detect that the aerial vehicle is located at the reference axis of the radar or antenna based on at least the first received signal and the second received signal;

xxiv. the system is configured to configured to detect that the aerial vehicle is located at the reference axis of the radar or antenna based on a detection of an extremum of a function depending at least from the first received signal and the second received signal;

xxv. the sensor is a radar or antenna, wherein the aerial vehicle is located in a blind zone of the radar or antenna, and wherein a signal transmitted by the aerial vehicle is delayed to simulate a virtual position of the aerial vehicle out of the blind zone.

xxvi. for a system including a plurality of sensors including at least one first sensor and at least one second sensor, the system is configured to detect that an aerial vehicle is located at a first reference axis of the first sensor, or at a first predetermined or calculated angle of the first reference axis of the sensor, obtain a position $P_{aerial}$ of the aerial vehicle upon its detection at the first reference axis of the first sensor, or at the first predetermined or calculated angle of the first reference axis of the first sensor, determine, at the position $P_{aerial}$ of the aerial vehicle, a deviation between the aerial vehicle and a second reference axis of the second sensor, determine, based at least on $P_{aerial}$ and a position $P_{sensor,1}$ of the first sensor, a cardinal direction with respect to the first reference axis of the first sensor, and determine, based at least on $P_{aerial}$, a position $P_{sensor,2}$ of the second sensor, and said deviation, the cardinal direction with respect to the second reference axis of the second sensor;

xxvii. the first sensor is an active sensor and the second sensor is a passive sensor;

xxviii. determination of the cardinal direction is obtainable without using an inertial system;

xxix. the aerial vehicle is a UAV or a drone;

xxx. the reference axis includes at least one of a broadside direction of the sensor, a boresight direction of the sensor, a center phase of the sensor.

In accordance with certain aspects of the presently disclosed subject matter, there is provided a system (e.g. a sensor) configured to determine data $P_{t1}, \ldots P_{tN}$ informative of at least one of a relative angular position and a range of an aerial vehicle with respect to a sensor at different instants of time, obtain data $P'_{t1}, \ldots P'_{tN}$ informative of position of the aerial vehicle at the different instants of time, and determine position of the sensor based at least on $P_{t1}, \ldots P_{tN}$ and $P'_{t1}, \ldots P'_{tN}$.

In accordance with certain aspects of the presently disclosed subject matter, there is provided a system comprising a processor and memory circuitry, wherein, for a system including a plurality of sensors including at least one first sensor and at least one second sensor, the system is configured to obtain a position $P_{aerial}$ of an aerial vehicle upon its detection at a first reference axis of the first sensor, or upon its detection at a first predetermined or calculated angle of the first reference axis of the first sensor, determine, at the position $P_{aerial}$ of the aerial vehicle, a deviation between the aerial vehicle and a second reference axis of the second sensor, determine, based at least on $P_{aerial}$ and a position $P_{sensor,1}$ of the first sensor, a cardinal direction with respect to the first reference axis of the first sensor, and determine, based at least on $P_{aerial}$, a position $P_{sensor,2}$ of the second sensor, and said deviation, the cardinal direction with respect to the second reference axis of the second sensor.

According to some embodiments, the proposed solution allows determining a cardinal direction (e.g. north direction) with respect to a sensor, in a quick and efficient way.

According to some embodiments, the proposed solution allows determining a cardinal direction (e.g. north direction) with less costly components.

According to some embodiments, a common approach is used to determine a cardinal direction (e.g. north direction) for a system of sensors. As a consequence, error and/or bias in the determination of the cardinal direction is common to all sensors, thereby facilitating determination of a target position by the system of sensors.

According to some embodiments, the proposed solution is operable to determine a cardinal direction (e.g. north direction) without requiring use of an inertial sensor.

According to some embodiments, the proposed solution is usable for various types of sensors, and for various platforms incorporating the sensors.

According to some embodiments, the proposed solution proposes an efficient and flexible solution to determine position of a sensor using an aerial vehicle.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter can be practiced without these specific details. In other instances, well-known methods have not been described in detail so as not to obscure the presently disclosed subject matter.

Unless specifically stated otherwise, as apparent from the following discussions, it is appreciated that throughout the specification, discussions utilizing terms such as "detecting", "obtaining", "determining", "delaying", or the like, refer to the action(s) and/or process(es) of a processor and memory circuitry that manipulate and/or transform data into other data, said data represented as physical data, such as electronic, quantities and/or said data representing the physical objects.

The term "processor and memory circuitry" covers any computing unit or electronic unit with data processing circuitry that may perform tasks based on instructions stored in a memory, such as a computer, a server, a chip, a processor, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages can be used to implement the teachings of the presently disclosed subject matter as described herein.

Figure 1:
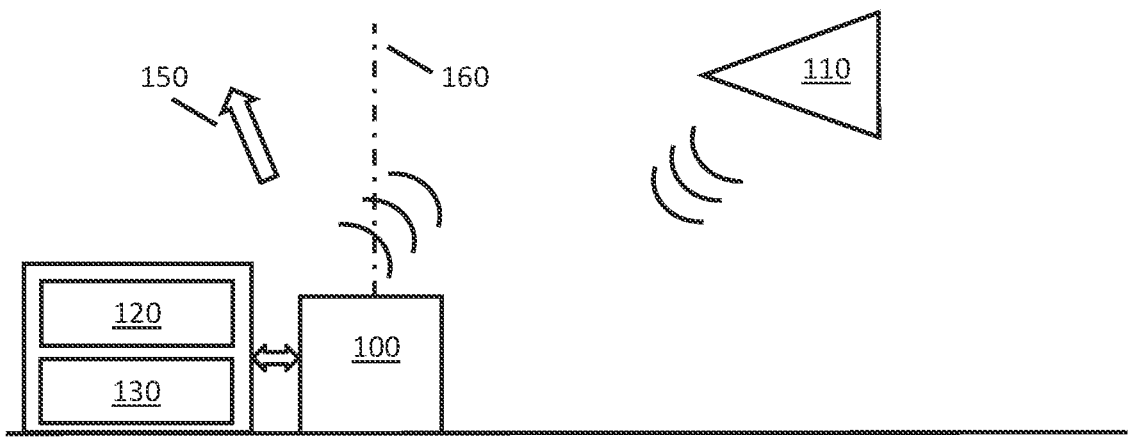
FIG. 1 illustrates an embodiment of an architecture usable to determine a cardinal direction with respect to a sensor.

FIG. 1 is a schematic representation of an embodiment of a sensor 100. The sensor 100 can be e.g. a radar, an antenna (e.g. phased array antenna, dish antenna, etc.), a LIDAR (this list is not limitative). According to some embodiments, the sensor 100 transmits electromagnetic waves towards space, which can be reflected back by a target 110. The sensor 100 can therefore detect the target 110 based e.g. on the electromagnetic waves reflected back by the target 100. In particular, the sensor 100 can obtain data representative of the position of the target 110 (which can include e.g. range, elevation and/or azimuth angle, etc.).

As explained hereinafter, there is a need to obtain data informative of a cardinal direction 150 with respect to the sensor 100, and in particular with respect to a reference axis 160 of the sensor 100. The cardinal direction corresponds in some embodiments to the north direction (geographical north). This information can be used to express the position of the target with respect to the north direction. This can be useful to communicate with more devices requiring a position of the target with respect to the north direction.

According to some embodiments, the cardinal direction can be to east, south or west direction.

As shown in FIG. 1, sensor 100 can include and/or can communicate with a processor and memory circuitry (see processor 120 and associated memory 130), which can perform various processing tasks as explained hereinafter.

Figure 2:
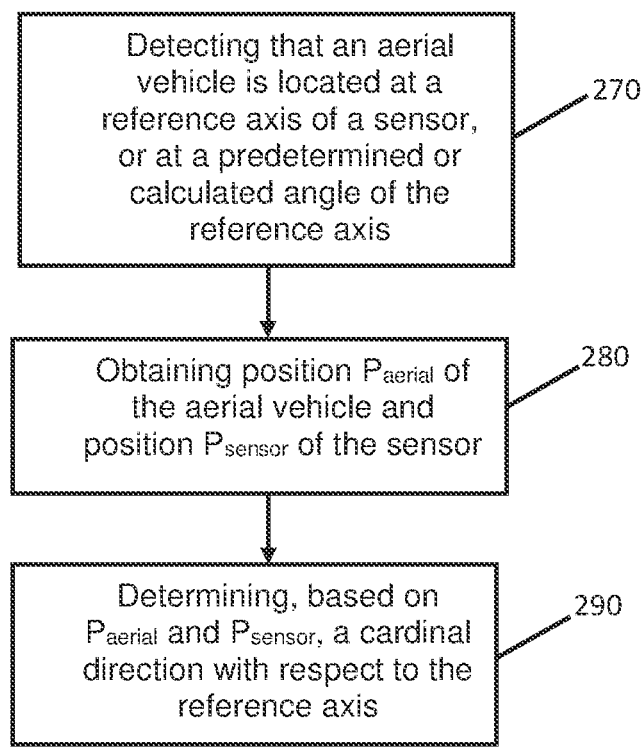
FIG. 2 illustrates a method of determining a cardinal direction with respect to a sensor.
Figure 2A:
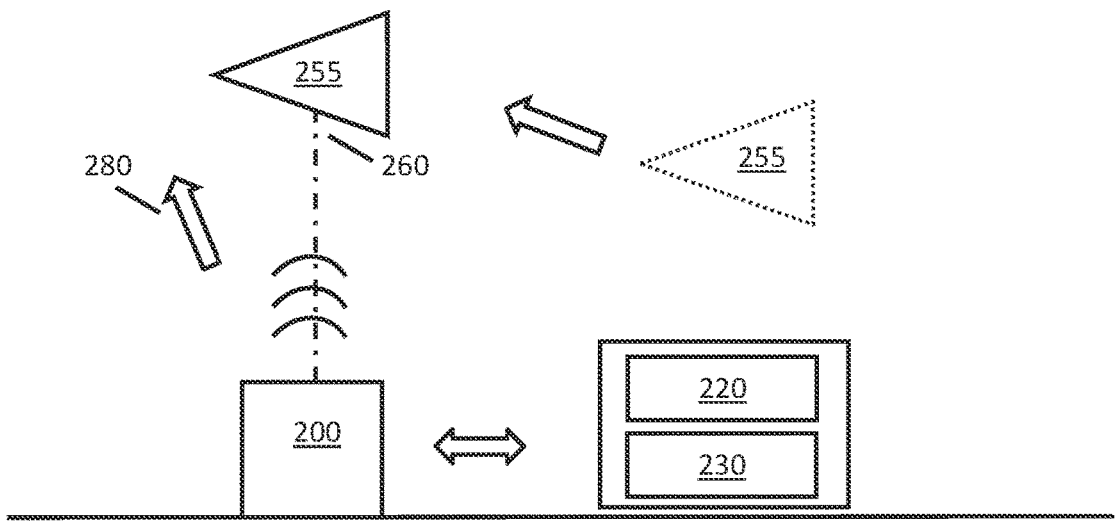
FIG. 2A illustrates an example of an operation of the method of FIG. 2.

Attention is now drawn to FIGS. 2 and 2A.

Assume that it is desired to determine a cardinal direction (e.g. north direction 280) with respect to a reference axis of a sensor.

The method includes detecting (operation 270) that an aerial vehicle (see e.g. reference 255 in FIG. 2A) is located at a reference axis (see e.g. reference 260) of the sensor (see e.g. reference 200 in FIG. 2A). In some embodiments, and as explained hereinafter, the method can include detecting that the aerial vehicle is located at a predetermined angle of the reference axis of the sensor, or at a calculated angle of the reference axis of the sensor. The predetermined or calculated angle can be obtained using various methods as described hereinafter.

Various embodiments for detecting that the aerial vehicle is located at the reference axis (or at a predetermined or calculated angle of the reference axis) of the sensor (operation 270) are provided hereinafter. In some embodiments, detection of the aerial vehicle at the reference axis can be performed by the sensor.

According to some embodiments, the sensor is an antenna or a radar, and the reference axis corresponds to the direction of maximum radiation of the sensor.

According to some embodiments, the reference axis can correspond to an axis including the phase center of an antenna.

According to some embodiments, the reference axis can be an axis which is tilted with reference to the direction of maximum radiation of the sensor.

For example, when a phased array antenna is used, it is possible to steer direction of the beam. When the beam is not steered, the direction of maximal direction is generally orthogonal to the antenna (also called broadside direction). For a given steering angle of the beam, there is a direction of maximum radiation (which is lower than the maximum radiation obtained when the beam is not steered). This direction can be selected as the reference direction (it is sometimes called boresight direction).

These examples of a reference axis are not limitative.

According to some embodiments, the aerial vehicle includes a drone and/or a UAV. This is not limitative, and, according to some embodiments, other aerial vehicles can be used (e.g. aircraft, helicopters, etc.). According to some embodiments, the aerial vehicle is launched on purpose for taking part in the process of determining the cardinal direction. The aerial vehicle can be in particular a friendly aerial vehicle, which is controlled to enter a zone covered by the sensor.

The method further includes obtaining (operation 280) position of the aerial vehicle upon its detection at the reference axis of the sensor, or upon its detection at the predetermined or calculated angle of the reference axis of the sensor. In some embodiments, the predetermined or calculated angle can be an angle in three dimensional space, or in two dimensional space. It can correspond to an angle (deviation angle) between a direction joining the sensor and the aerial vehicle, and the reference axis.

According to some embodiments, $P_{aerial}$ is expressed in absolute coordinates (and not relatively to the radar), such as using latitude and longitude coordinates.

According to some embodiments, $P_{aerial}$ can be obtained using a GPS device embedded in the aerial vehicle. Since the time at which the aerial vehicle has been detected at the reference axis is known from operation 270, the corresponding position of the aerial vehicle can be determined using position data acquired by the GPS device of the aerial vehicle over time. This processing can be performed e.g. by a processor and memory circuitry of the aerial vehicle, and/or by another processor and memory circuitry (e.g. by processing unit 220 and memory 230 operatively connected to sensor 200).

According to some embodiments, a camera embedded on the UAV acquires reference points in the scene (whose positions are known) and $P_{aerial}$ is determined using photogrammetry (e.g. close-range photogrammetry).

According to some embodiments, the sensor is a radar, and position of the aerial vehicle is determined as follows. Range of the aerial vehicle is known based on radar measurements (or using a laser). A camera is affixed to the radar (or to a platform on which the radar is located) and has known orientation with respect to the radar. When the aerial vehicle is located at a given position in the image of the camera, azimuth and elevation angles of the aerial vehicle are known with respect to the camera, and therefore with respect to the radar. Based on this data (range, azimuth and elevation), it is possible to determine position of the aerial vehicle.

Position of the sensor 200 can be determined using different methods. According to some embodiments, sensor 200 is a static sensor (meaning that its center of mass is substantially static in a terrestrial referential, but this does not prevent rotation of the sensor) and therefore, the position of the sensor 200 is known (e.g. using a position sensor).

According to some embodiments, sensor 200 embeds a position sensor (such as a GPS sensor) which provides position of the sensor (e.g. latitude, longitude and altitude coordinates).

In some embodiments, position of the sensor 200 is stored in a memory, and obtaining position of the sensor 200 includes accessing the memory to extract this position.

Figure 10:
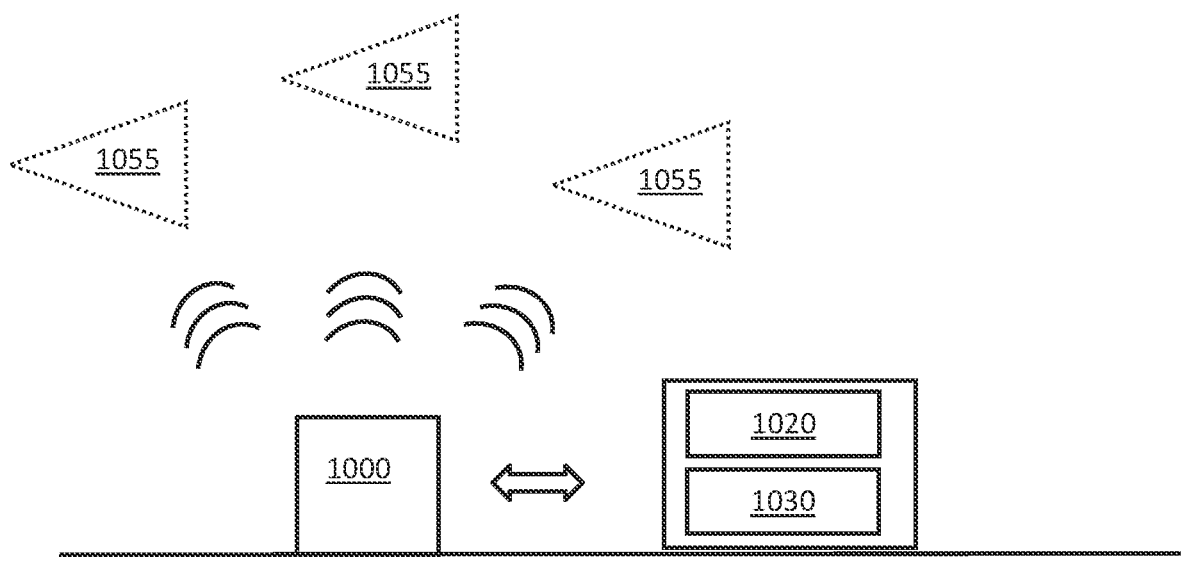
FIGS. 10 and 11 illustrate a method of determining a position of a sensor using an aerial vehicle.
Figure 11:
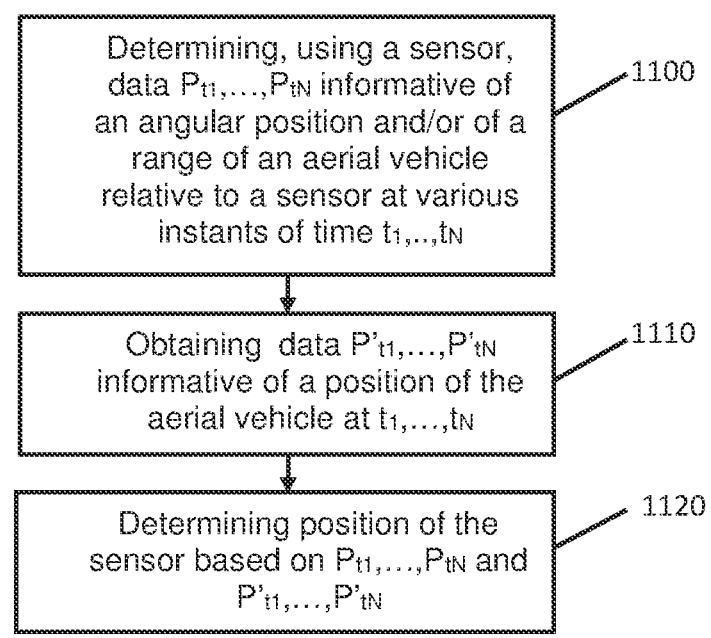

In some embodiments, position of the sensor 200 can be determined using the aerial vehicle, as explained e.g. with reference to FIGS. 10 and 11.

The method further includes (operation 290) determining, based at least on $P_{aerial}$ and $P_{sensor}$, a cardinal direction with respect to the reference axis of the sensor.

As explained below, the cardinal direction is first determined e.g. in UTM reference (UTM North) and then converted into a geographical cardinal direction.

In particular, as mentioned above, direction 280 of the north can be determined with respect to the reference axis 260.

Operations 280 and 290 can be performed by a processor and memory circuitry located in the sensor, and/or by an external processor and memory circuitry.

A non-limitative example of implementing operation 290 is provided hereinafter, with reference to FIGS. 3 and 3A.

In some embodiments, position $P_{aerial}$ and $P_{sensor}$ are already expressed in Universal Transverse Mercator (UTM) coordinates (for example, a position sensor of the sensor and position sensor of the UAV already provide position data in UTM coordinates). Therefore, a vector (vector joining the sensor to the aerial vehicle located at $P_{aerial}$—that is to say when the aerial vehicle is located at the reference axis of the sensor 300, or at a predetermined or calculated angle of the reference axis of the sensor 300) is already expressed in Universal Transverse Mercator (UTM) coordinates (operation 305).

In other embodiments, $P_{aerial}$ and $P_{sensor}$ are not expressed in Universal Transverse Mercator (UTM) coordinates. A vector $V_1$ (vector joining the sensor to the aerial vehicle located at $P_{aerial}$—that is to say when the aerial vehicle is located at the reference axis of the sensor 300) can be determined (operation 315) and can be converted into a vector $V'_1$ expressed in the Universal Transverse Mercator (UTM) coordinates (operation 325).

In particular, UTM coordinates include a zone number, a hemisphere (north/south), an casting (E) and a northing (N). Eastings are referenced from the central meridian of each zone, and northings from the equator, both in metres.

A possible algorithm for converting longitude (φ) and latitude (λ) into UTM coordinates (E, M) is provided e.g. in "*Conversion of Latitude and Longitude to UTM Coordinates*", John G. Manchuk, Paper 140, CCG Annual Report 11, 2009 (incorporated herein by reference). This is not limitative and other equations can be used. It is also possible to use dedicated converters which convert longitude and latitude into UTM coordinates.

It is therefore possible to convert $P_{aerial}$ (expressed in at least longitude, latitude) and $P_{sensor}$ (expressed in at least longitude and latitude), which constitute vector $V_1$, into $P_{aerial,UTM}$ (expressed in the UTM coordinates) and $P_{sensor,UTM}$ (expressed in the UTM coordinates), which constitute a vector $V'_1$ expressed in the UTM coordinates.

Figure 3:
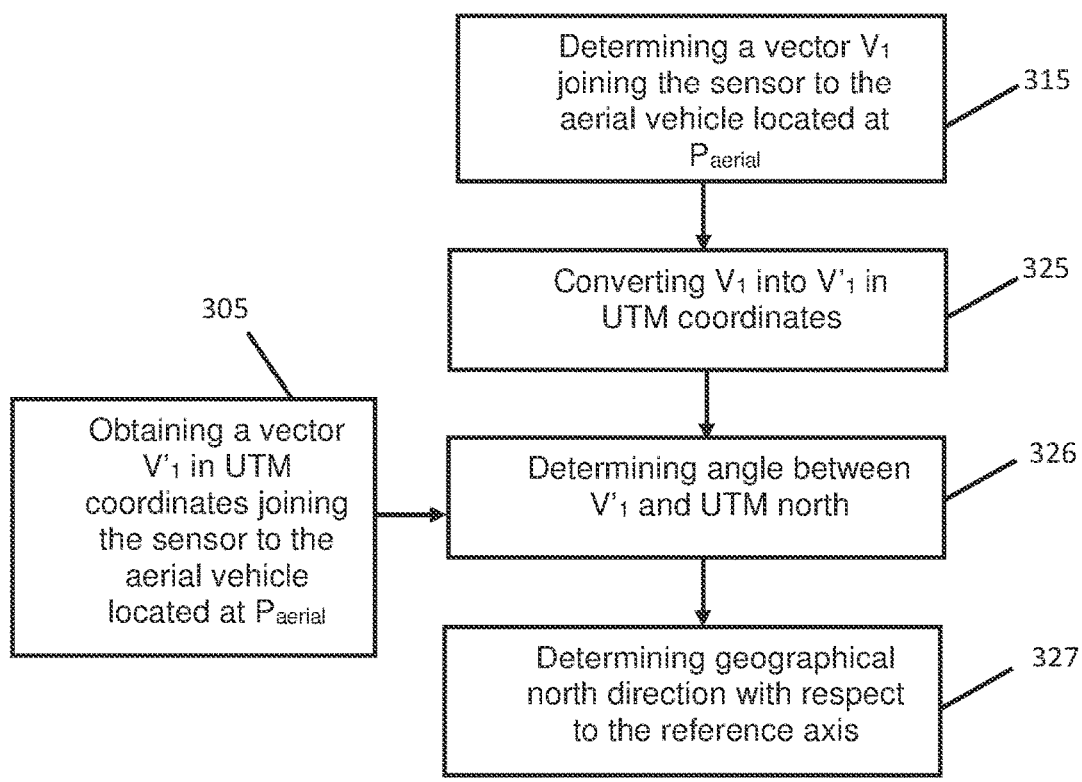
FIG. 3 illustrates a method allowing determining a cardinal direction, and in particular the north direction.
Figure 3A:
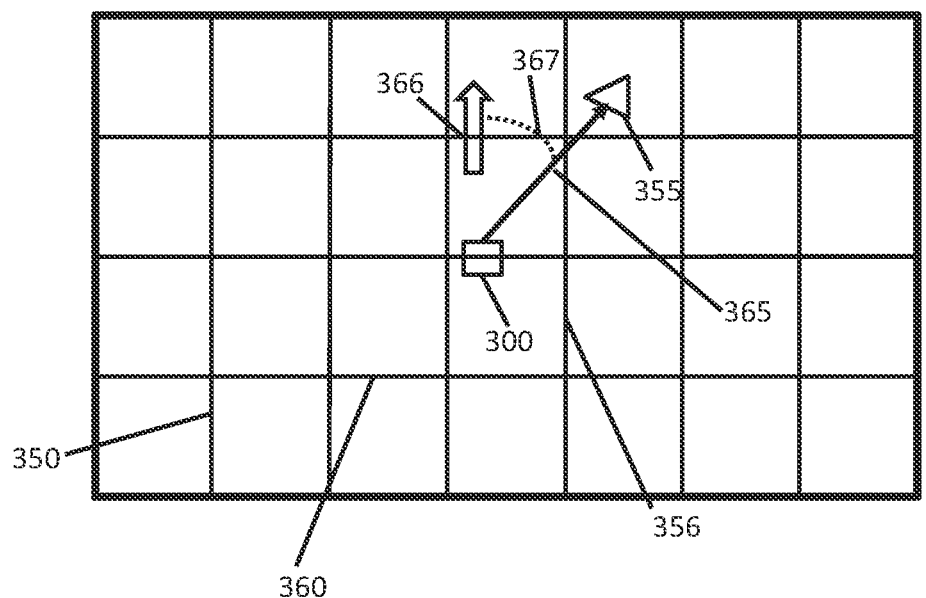
FIG. 3A illustrates a non-limitative example of the method of FIG. 3.

FIG. 3A shows an example of a UTM zone. The vertical lines 350 correspond to the meridians present in this zone, which include in particular a central meridian 356 of the zone. The horizontal lines 360 correspond to the latitude lines present in this zone.

The sensor is referred to as 300 and the aerial vehicle as 355. Once the vector $V'_1$ is determined in the UTM coordinates (see reference 365 representative of $V'_1$), it is possible to determine an angle 367 between the vector $V_1'$ and a cardinal direction 366 (e.g. north direction) in the UTM coordinates. Indeed, all the meridians 350 are modelled in the UTM zone as pointing towards the north. As a consequence, the north direction of the UTM zone is determined.

In practice, there is a deviation between the north direction of the UTM zone and the true geographical north. A correction can be applied to determine the true geographical north. A method for determining this correction is provided hereinafter. This method is not limitative and other corrections or methods can be used.

Assume a correcting factor K is computed, such that:

$$K=\delta \sin(\varphi)$$

In this equation, δ is a difference (angle) between a meridian on which the sensor 300 is located and a central meridian 356 of the UTM zone. This can be computed since the longitude of the sensor is known (since position $P_{sensor}$ of sensor 300 is known) and the central meridian has a known longitude.

φ is the latitude of the sensor 300 (which is known, since position of the sensor 300 is known).

As explained above, an angle 367 (hereinafter α) between the vector $V_1'$ and a cardinal direction 366 (e.g. north direction) in the UTM coordinates has been determined.

The correcting factor F is applied to α, in order to obtain an angle σ between the cardinal direction (e.g. geographical north) and a reference axis of the sensor 300 (the vector $V'_1$ is located on the reference axis of the sensor 300).

$$\sigma=\alpha+K$$

Therefore, an angle σ between the geographical north and a reference axis of the sensor is obtained. As mentioned above, various reference axis can be selected and therefore, geographical north direction is known with respect to the selected reference axis.

Since geographical north direction is known, south direction can be determined (opposite to north direction), and the same applies to e.g. east and west directions (orthogonal to north and south direction).

Although the method of FIG. 3 (and other methods described hereinafter) have been described with reference to a conversion of the vector joining the sensor to the detected aerial vehicle into UTM coordinates in order to determine geographical north, according to some embodiments, a coordinate system different then UTM coordinate system can be used (in which a north direction is defined and has a known relationship with respect to geographical north).

Figure 4:
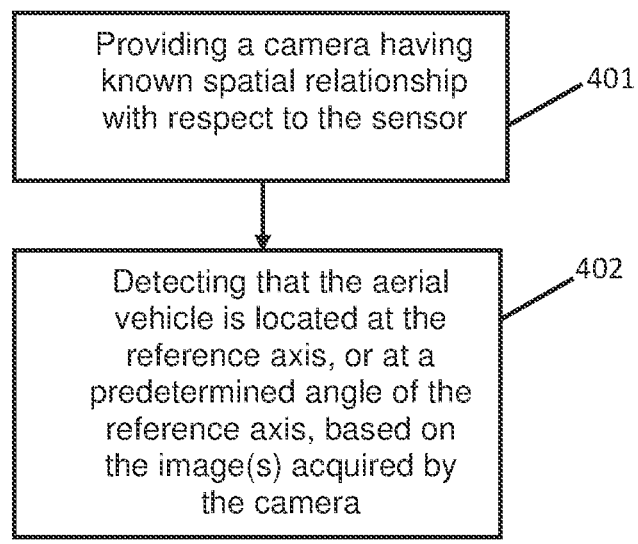
FIG. 4 illustrates a method of detecting that an aerial vehicle is located at a reference axis of a sensor.

Attention is now drawn to FIG. 4.

Figure 4A:
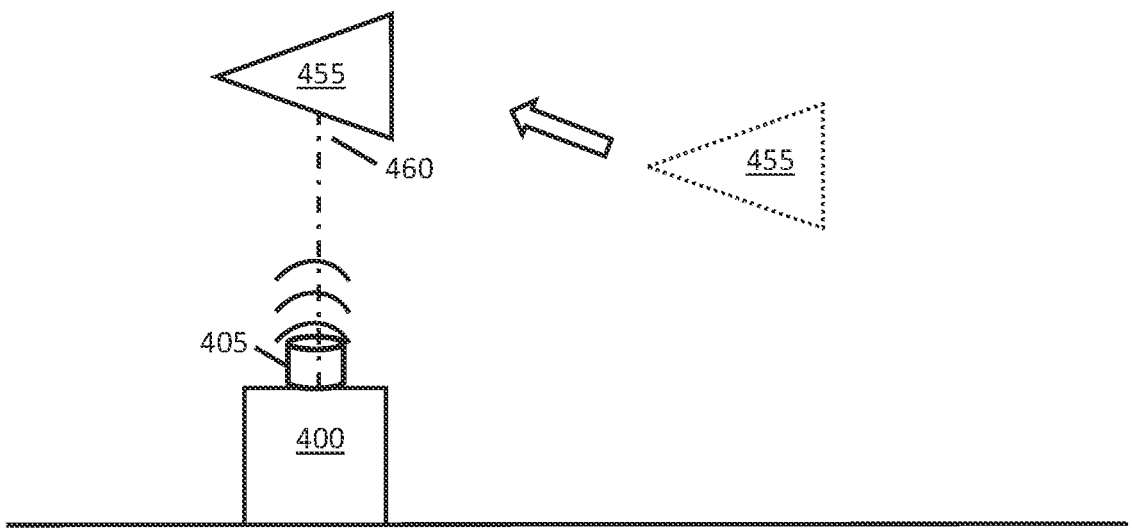
FIGS. 4A and 4B illustrate a non-limitative example of the method of FIG. 4.
Figure 4B:
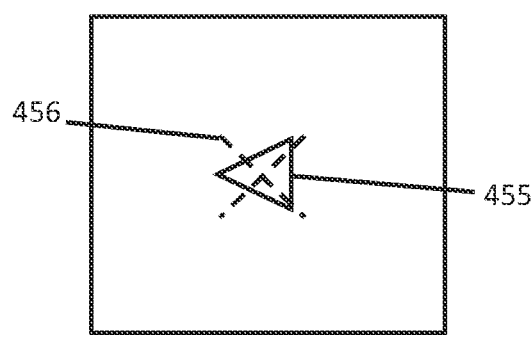

As mentioned with reference to operation 270 (see FIG. 2), it can be detected that the aerial vehicle is located at the reference axis of the sensor, or at a predetermined angle of the reference axis of the sensor. FIGS. 4, 4A and 4B depict a possible embodiment of a method for performing this detection.

Assume that a camera 405 is provided having known spatial relationship relative to the sensor 400 (operation 401).

In some embodiments, the camera 405 has an optical axis (line of sight) which is aligned with the reference axis (460—see FIG. 4A).

In other embodiments, the camera 405 has an optical axis (line of sight) which is deviated with respect to the reference axis (460—see FIG. 4A) according to one or more angles (e.g. pitch, roll, yaw), which are known.

The camera can be affixed e.g. to the sensor, or to a platform on which the sensor is located. In other words, a system including the sensor and the camera is provided.

Since the camera has a known spatial relationship relative to the sensor, it can be determined that when the aerial vehicle is located in a predetermined area of the image acquired by the camera (see cross 456), this corresponds to the fact that the aerial vehicle is located at the reference axis 460 of the sensor 400, or at a predetermined angle with respect to the reference axis 460.

For example, if the camera has a line of sight which is aligned with the reference axis 460, then detection of the aerial vehicle at the cross 456 of the camera indicates that the aerial vehicle is located at the reference axis 460. If the camera has a line of sight which is deviated (with a known deviation) with respect to the reference axis, then detection of the aerial vehicle at the cross 456 of the camera indicates that the aerial vehicle is located at a predetermined angle (corresponding to the known deviation of the camera) of the reference axis.

Detection of the UAV at the cross of the camera can be performed by an operator and/or using automatic detection methods (e.g. image processing methods).

In FIG. 3, it has been described a method of determining geographical North direction based on determination of UTM north direction. In some embodiments, when the camera has a known deviation with respect to the reference axis of the sensor, then the method of FIG. 3 can be modified as explained hereinafter with reference to FIGS. 4C and 4D.

Assume (see FIG. 4D) that it has been detected that the aerial vehicle 455 is located at the cross of the camera 406, which indicates that the aerial vehicle is located a predetermined (known) angle 456 of the reference axis 457 of the sensor 400.

Upon detection of the aerial vehicle 455, it is possible to obtain position $P_{aerial}$ of the aerial vehicle 455, and position of the sensor $P_{sensor}$.

As explained above, if $P_{aerial}$ and $P_{sensor}$ are already expressed in UTM coordinates, a vector $V'_1$ (see reference 465) joining $P_{sensor}$ to $P_{aerial}$ is obtained in UTM coordinates. Otherwise, a vector $V_1$ joining to $P_{sensor}$ to $P_{aerial}$ can be converted into UTM coordinates (see operations 415 and 425, similar to operations 315 and 325), as explained above, to obtain $V'_1$.

It is then possible to determine an angle α (see reference 461) between $V'_1$ (reference 465) and UTM north 466 (operation 426). Details relative to the determination of angle α are provided with reference to operation 326. This provides in turn an angle σ between $V'_1$ and the geographical north (operation 427, similar to operation 327 above). However, as mentioned above, there is a deviation between the line of sight of the camera and the reference axis, and therefore, vector $V_1/V'_1$ (reference 465, which joins the sensor to the aerial vehicle upon its detection at the line of sight of the camera) is deviated by a predetermined angle 456 (corresponding to the deviation angle(s) of the camera with respect to the sensor) from the reference axis 457 of the sensor. A correction (which corresponds to the known predetermined deviation angle(s) of the camera with respect to the sensor) is applied (operation 428) to a which yields therefore the orientation of the geographical north with respect to the reference axis 457 of the sensor. This correction can be in some embodiments applied beforehand to σ which yields the same result.

The method described above can be applied similarly when the aerial vehicle is detected at a position $P_{aerial}$ for which it has a known deviation angle with respect to the reference axis (the known deviation angle can be e.g. determined using a monopulse method, as described hereinafter).

Figure 5:
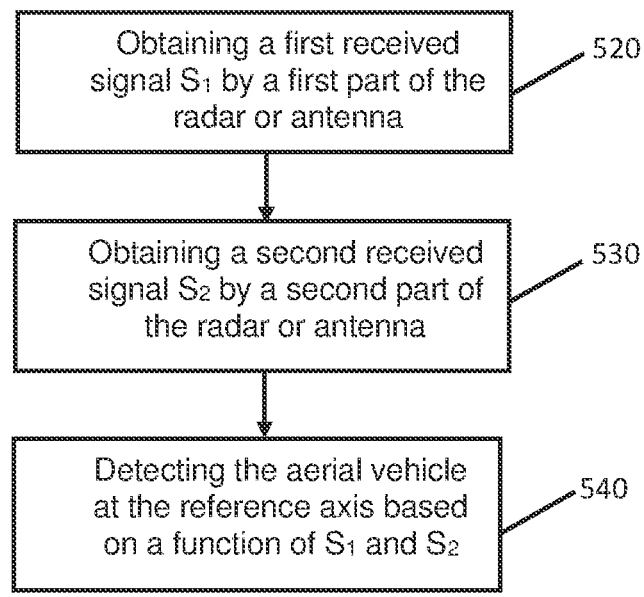
FIG. 5 illustrates another method of detecting that an aerial vehicle is located at a reference axis of a sensor.
Figure 5A:
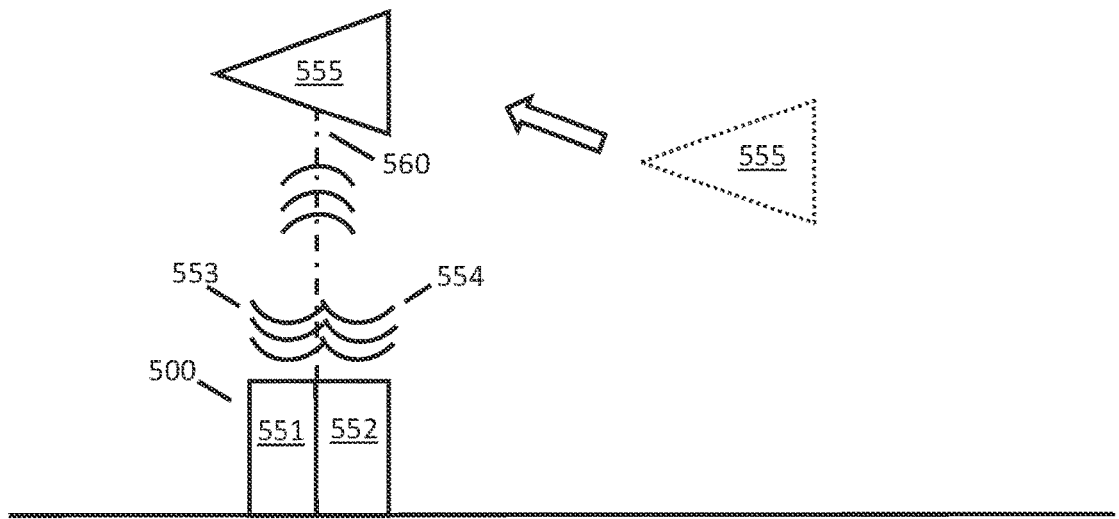
FIG. 5A illustrates a non-limitative example of the method of FIG. 5.

Attention is now drawn to FIGS. 5 and 5A.

According to some embodiments, the sensor 500 is a radar or an antenna and includes at least two parts (see e.g. 551 and 552) each including elements (e.g. antennas). According to some embodiments, the sensor is a monopulse radar or antenna, which transmits a signal towards space. The transmitted electromagnetic signal is reflected. The method of FIG. 5 relies in particular on a monopulse detection method.

Each part 551, 552 is configured to sense the electromagnetic signal reflected by the aerial vehicle. A first received signal $S_1$ (see reference 553) is detected by the first part 551 of the radar, and a second received signal $S_2$ (see reference 554) is detected by the second 552 part of the radar.

Various processing can be performed on $S_1$ and $S_2$. According to some embodiments, a sum signal $(S_1+S_2)$ is generated and a difference signal $(S_1-S_2)$ is generated. This processing can be performed e.g. by a combiner of the sensor 500.

Detecting that the aerial vehicle 555 is located at the reference axis of the sensor (in particular, at the broadside or boresight of the sensor) can be performed (operation 540) based on a function F depending from the first signal $S_1$ and the second signal $S_2$, and in particular by detecting an extremum of F. According to some embodiments, the function F is: $F(t)=(S1(t)+S2(t))/(S1(t)-S2(t))$. When a maximal value of F is obtained, this corresponds to the fact that the aerial vehicle is located at the maximal radiation direction of the sensor, which corresponds to the reference axis of the sensor. Operation 540 can be performed in some embodiments in the sensor itself, or by a processor and memory circuitry in communication with the sensor.

The method of FIG. 5 can be performed similarly both when the beam is not steered, and when the beam of the sensor is steered at a given angle (in order to detect when the aerial vehicle is located at a reference axis corresponding to the maximal radiation direction for this given steering angle).

Signals $S_1$ and $S_2$ (and in particular function F) can be used to calculate to what extent the position of the aerial vehicle deviates (deviation angle) from the maximal radiation direction for a given steering angle of the beam. Since the steering angle of the beam is known, the deviation angle of the aerial vehicle with respect to the broadside axis (maximal radiation direction obtained when the beam is not steered) can be determined.

For example, the more the aerial vehicle deviates from the maximal radiation direction, the lower the value of F. As a consequence this method can be used both for detection that the aerial vehicle is located at the reference axis (maximum radiation axis) or deviates with a calculated angle (as calculated e.g. by this method) with respect to the reference axis.

Figure 6:
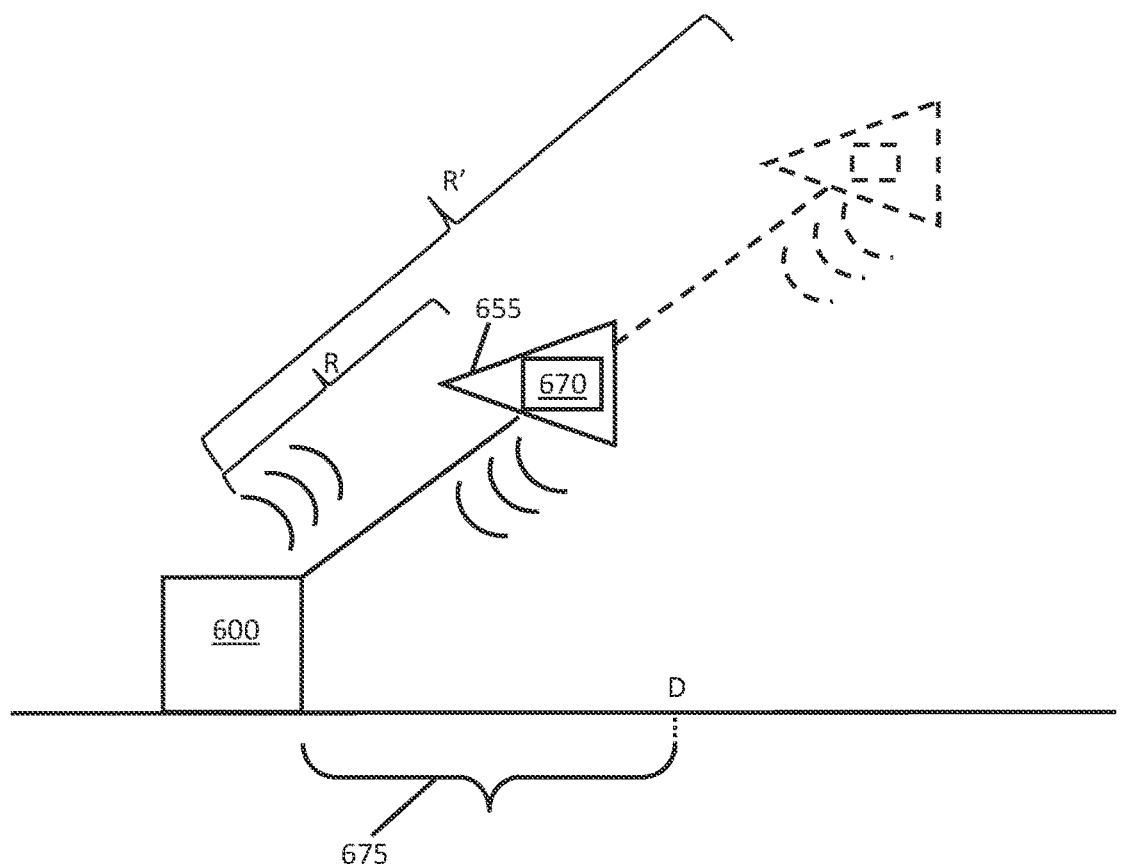
FIGS. 6 and 6A illustrate a method allowing detection of an aerial vehicle by a sensor even if it is located within a blind zone of the sensor.
Figure 6A:
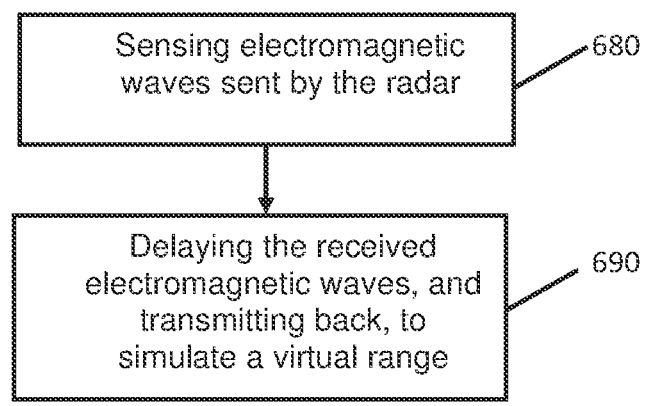

Attention is now drawn to FIGS. 6 and 6A.

According to some embodiments, the aerial vehicle 655 embeds a device 670. The device 670 can include a receiver, which can include e.g. one or more antennas. The receiver can in particular receive one or more electromagnetic signals emitted by one or more sensors 600 (see operation 680). The device 670 can further comprise at least one processor and memory circuitry, which is configured to apply a delay, or a plurality of delays, to the received electromagnetic signals (see operation 690). In this case, the delay is implemented digitally. This can be performed by introducing some delay in the digital representation of the electromagnetic signals, which can be obtained e.g. using analog to digital converters. In some embodiments, the delay can be introduced by writing the received electromagnetic signals in a memory during a first period of time T1, and reading these electromagnetic signals in the memory during a second period of time T2, wherein T2>T1. This is, however, not limitative.

According to some embodiments, one or more delay lines can be used and implemented using analog components, such as wires.

According to some embodiments, the processor and memory circuitry can be configured to apply a predefined delay when the device 670 (or the aerial vehicle 655) enters a predefined proximity zone 675 of the sensor 600. This predefined delay can in particular be selected to simulate a virtual range of the device 670 (or of the aerial vehicle 655) which is out of the proximity zone of the radar. According to some embodiments, the sensor 600 is a radar and the predefined proximity zone 630 can correspond to a "blind zone" of the radar 600. Indeed, radars (e.g. pulsed radars) are generally operated so that there exists a zone located in the vicinity of the radar (the size D of the zone depends on the pulsed radar), for which the radar (e.g. pulsed radar) is not able to detect targets. This is due notably to the fact that when this kind of radar (pulsed radar) is transmitting, the receiver is off, thereby creating a blind zone.

The proximity zone 675 can be e.g. a sphere whose center is located around the radar and which has a radius D. This is, however, not limitative, and the proximity zone can have a different shape.

The dimensions of the proximity zone 675 are generally known in advance for each radar.

If the device 670 (or the aerial vehicle 655) is within the proximity zone 675 of the radar 600 (at a range R from the radar 600), the device 670 allows simulating, as if the device 670 and the aerial vehicle 655 were located at a range R' which is out of the proximity zone 675.

Indeed, the value of the delay can be selected by the processor and memory circuitry so that the virtual range of the device 670 (or of the aerial vehicle 655) is located out of the blind zone of the radar.

As a consequence, determination of the cardinal direction can be performed even if the device 670/aerial vehicle 655 are actually located within the blind zone of the radar, using the various methods described above. For example, in FIG. 2, at operation 270, the aerial vehicle is detected at a reference axis of a radar or antenna even if the aerial vehicle is located in the blind zone of the radar or antenna, by delaying the signal received from the radar or antenna and transmitting it back to the radar or antenna (the delay allowing a virtual range out of the blind zone, which, in turn, allow detection by the sensor of the aerial vehicle at its reference axis).

Figure 7:
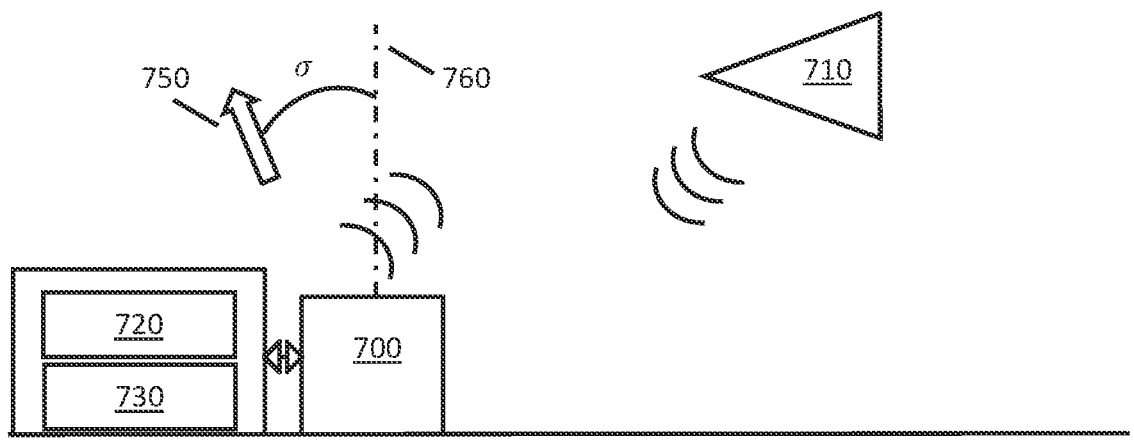
FIGS. 7 and 7A illustrate a method of determining a position of a target with respect to a cardinal direction.
Figure 7A:
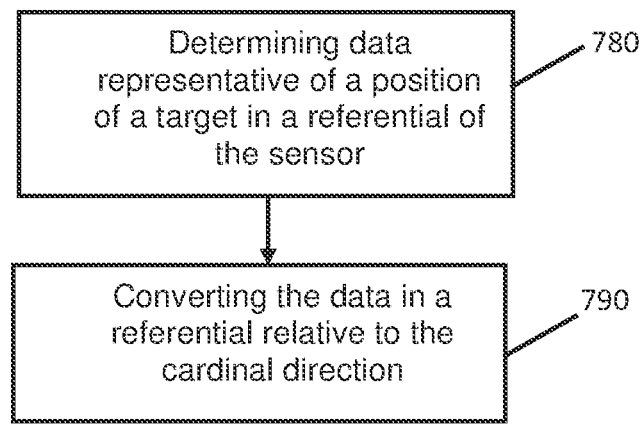

Attention is now drawn to FIGS. 7 and 7A.

Once the cardinal direction 750 (e.g. north) is known with respect to a reference axis 760 of the sensor 700 (for example the angle σ is known), this can be used for subsequent detection of targets.

Assume that a target 710 has been detected by sensor 700. Generally, the sensor 700 provides data representative of the position of the target in the referential of the sensor (see operation 780), and in particular, relative to the reference axis 700. For example, in a monopulse radar, the reference axis 700 can be selected as the broadside direction of the radar (e.g. orthogonal to the radar), and the radar provides azimuth and elevation angles with respect to the reference axis 700. Since the cardinal direction is known with respect to the reference axis, data representative of the position of the target can be expressed with respect to the north direction. According to some embodiments, this conversion (see operation 790) can be performed by a processor and memory circuitry (see processing unit 720 and associated memory 730), in communication with the sensor 700, or included in the sensor 700.

Data representative of the position of the target expressed with respect to the north direction can be transmitted e.g. to other systems (e.g. navigation systems, aircraft, etc.) which require coordinates of the target expressed in worldwide coordinates/referential (and not in the sensor referential).

Figure 8:
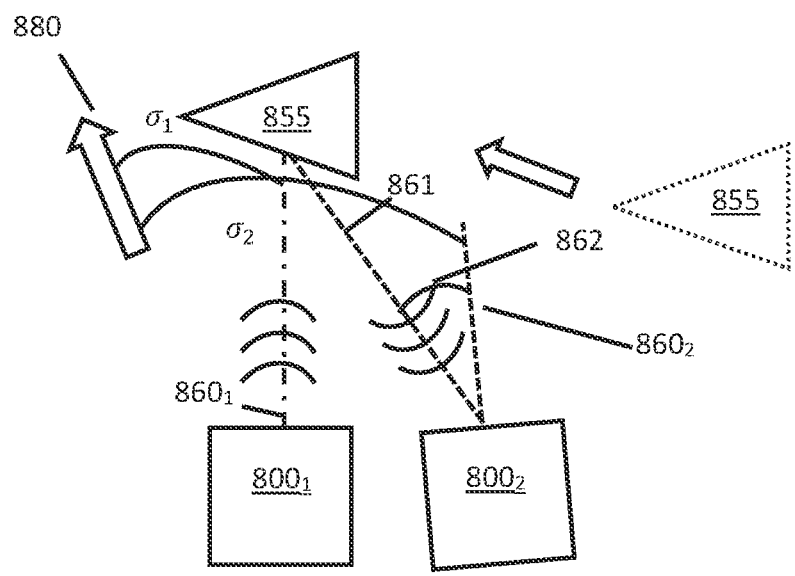
FIGS. 8 and 9 illustrate a method of determining a cardinal direction for a system of sensors.
Figure 9:
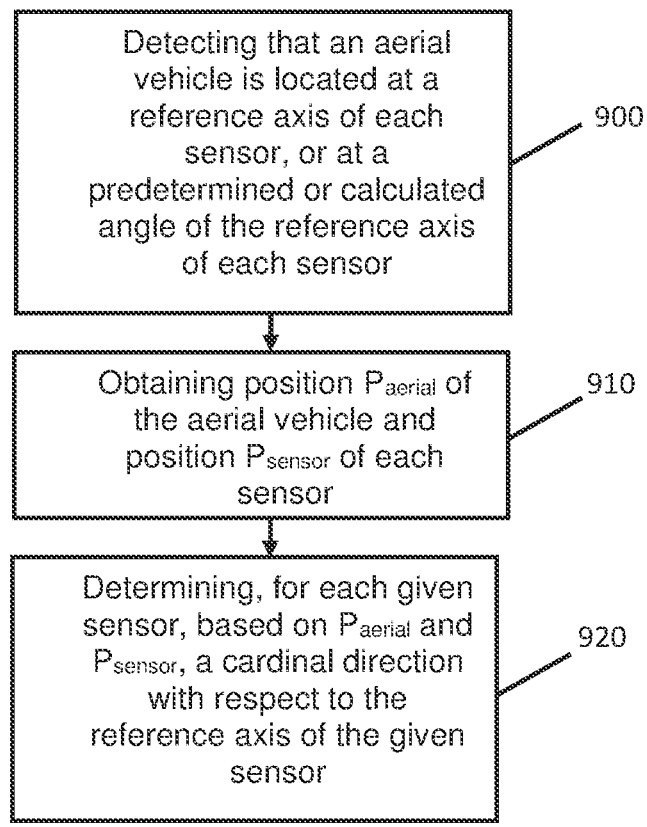

Attention is now drawn to FIG. 8.

According to some embodiments, a system including a plurality of sensors (see e.g. first sensor $800_1$ and second sensor $800_2$) is deployed. It can be required to determine a cardinal direction 880 (e.g. north) with respect to each sensor. The system can include more than two sensors.

In some embodiments, at least one of the plurality of sensors $800_1$, $800_2$ is an active sensor, and at least one of the plurality of sensors $800_1$, $800_2$ is a passive sensor. In this example, sensor $800_1$ is active (meaning that it can both transmit and receive signals), and sensor $800_2$ is passive (meaning that it receives signals without transmitting signals).

In some embodiments, all sensors of the system can be active sensors.

The method can include detecting (operation 900), at a given instant of time t, that an aerial vehicle 855 is located is located at a reference axis of each sensor, or at a predetermined or calculated angle of the reference axis of each sensor. In other words, the aerial vehicle is concurrently detected by the plurality of sensors of the system.

For example, this can include detecting the aerial vehicle at a first reference axis $860_1$ of the first sensor $800_1$, or at a first predetermined angle of the first reference axis $860_1$.

In this non limitative example, reference axis $860_1$ corresponds to the broadside axis of the sensor $800_1$. Various embodiments have been provided hereinafter to detect that the aerial vehicle is located on the reference axis of a sensor (see e.g. FIGS. 4 and 5).

In the example of FIG. 8, the method can further include detecting, by the second sensor $800_2$, the aerial vehicle, wherein the detection includes determining, at the position $P_{aerial}$ of the aerial vehicle, a deviation between the aerial vehicle and a second reference axis of the second sensor (in some embodiments, this deviation can be null and the aerial vehicle is located at the second reference axis).

In FIG. 8, direction of the aerial vehicle 855 with respect to the second sensor $800_2$ is located at an angle 862 with respect to the second reference axis $860_2$ (broadside axis) of the second sensor $800_2$.

Angle 862 (corresponding to the deviation of the aerial vehicle with respect to the second reference axis) can be obtained using different methods.

Figure 4C:
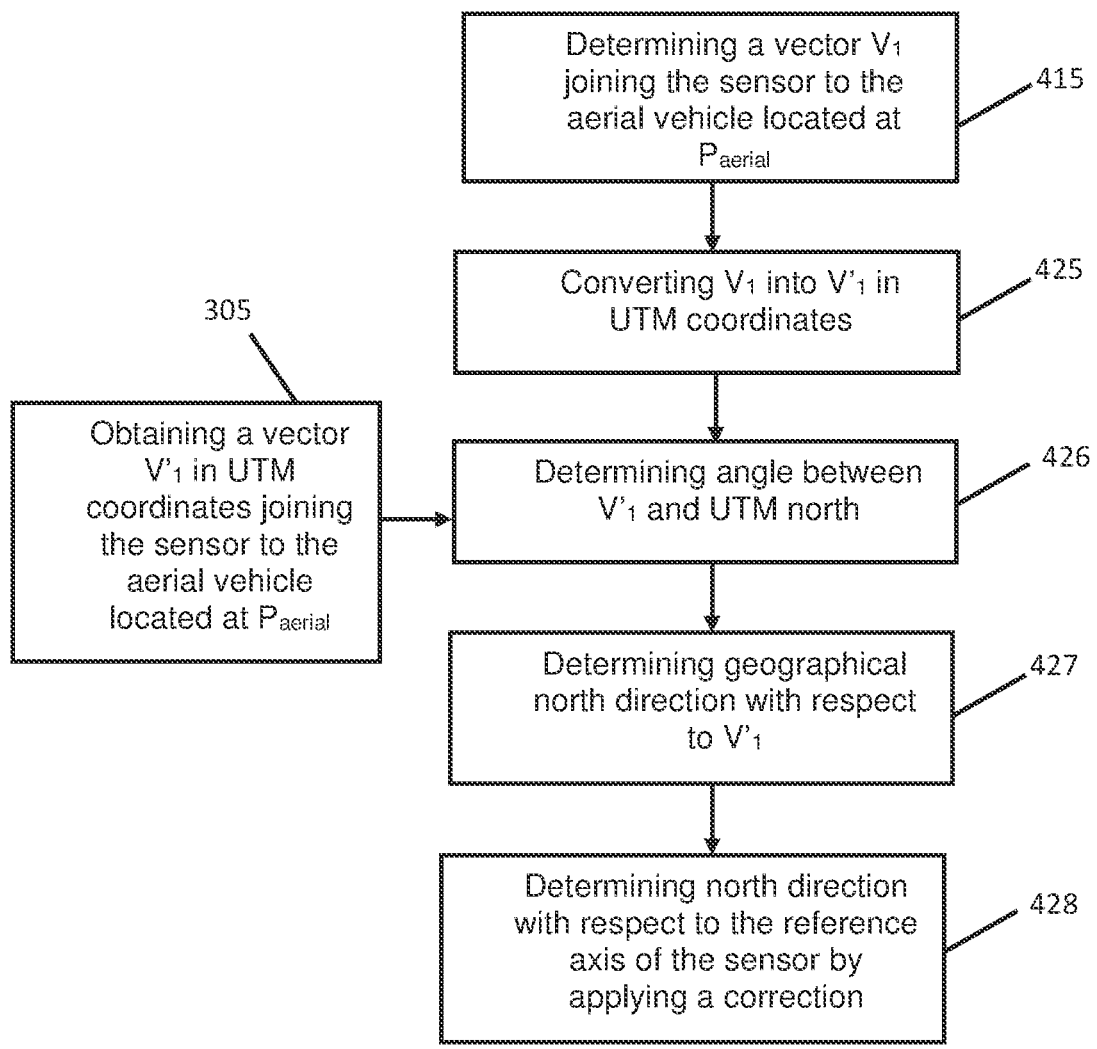
FIGS. 4C and 4D illustrate a method allowing determining a cardinal direction, using a camera affixed to the sensor.

If the method of FIG. 4C is used (in which a camera is used in combination with the sensor), then angle 862 is predetermined and corresponds to the predetermined deviation angle of the light of sight of the camera with respect to the reference axis.

In other embodiments, angle 862 can be calculated since main sensing direction of the antenna is known (e.g. in a phased array antenna, phases of the antenna elements are known and therefore the main direction at which the phased array antenna senses signals reflected by the target is known), and a monopulse method (see e.g. FIG. 5) can provide deviation of the aerial vehicle with respect to the main sensing direction of the antenna. In response to the electromagnetic signal reflected by the aerial vehicle, and as explained above, a first subset of the antenna elements of the sensor can detect a first received signal, and a second subset of the antenna elements of the sensor can detect a second received signal, wherein a function of the first received signal and of the second received signal provides deviation of the aerial vehicle with respect to the main sensing direction of the antenna. Since angle between the main sensing direction and the second reference axis of the second sensor is known, angle 862 can be calculated.

The method can include obtaining (operation 910) a position $P_{aerial}$ of the aerial vehicle upon its detection at the first reference axis of the first sensor, or at the first predetermined or calculated angle of the first reference axis of the first sensor, and a position of each sensor ($P_{sensor,1}$ for the first sensor and $P_{sensor,2}$ for the second sensor, which can be obtained using e.g. position sensors affixed to the sensors). $P_{aerial}$ is also the position at which the aerial vehicle is detected at a predetermined or calculated angle of the second sensor.

The method further includes determining (operation 920), based at least on $P_{aerial}$ and the position $P_{sensor,1}$ of the first sensor $800_1$, a cardinal direction (e.g. geographical north 880) with respect to the first reference axis $860_1$ of the first sensor $800_1$. If there is a deviation between the aerial vehicle and the first reference axis, this deviation angle is also used to determine the cardinal direction.

The various methods described beforehand (see e.g. FIGS. 3 and 4) can be used to determine the geographical north 880 with respect to the first reference axis $860_1$.

The method further includes determining (operation 920), based at least on $P_{aerial}$ and the position $P_{sensor,2}$ of the second sensor $800_2$, the cardinal direction (e.g. geographical north 880) with respect to the second reference axis $860_1$ of the second sensor $800_2$.

Figure 4D:
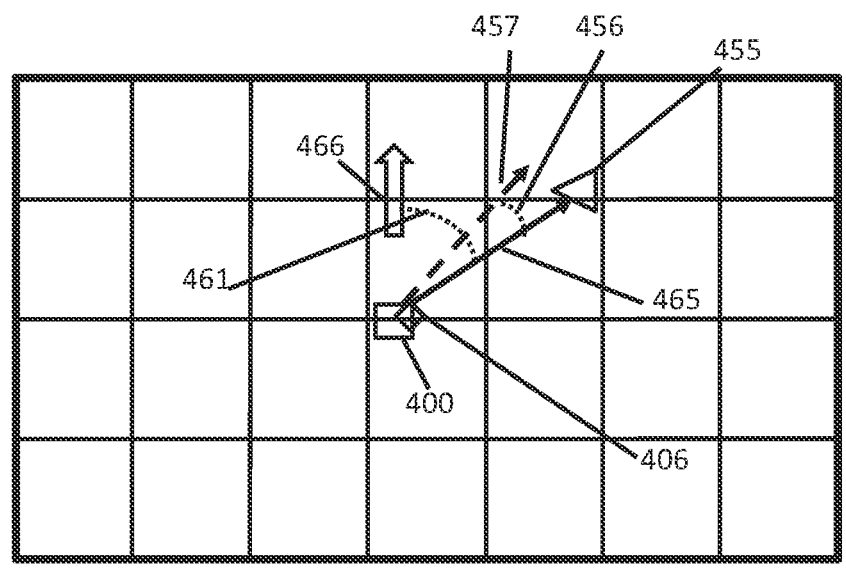

It has been described e.g. with reference to FIGS. 4C and 4D that it is possible to determine the cardinal direction with respect to the reference axis of a sensor even when the aerial vehicle is detected at a predetermined or calculated angle of the reference axis, and this method can be applied similarly herein.

As a consequence, for each sensor of the system, an angle between the reference axis of the sensor and the geographical north 880 is obtained (angle $\sigma_1$ for sensor $800_1$, angle $\sigma_2$ for sensor $800_2$). The method can be used similarly for a larger number of sensors.

Since an aerial vehicle is commonly and concurrently detected by all sensors of the system, an error in detecting direction of the geographical north 880 is common to all sensors of the system, thereby simplifying and improving conversion of target position with respect to the north direction. The whole system is therefore more accurate. Indeed, if an error is present in determining north direction due to an error in the position of the aerial vehicle then this error is common to both the first and second sensors, which is not the case if each sensor of the system determines north direction using independent methods and/or independent sensors (which can increase the level of error).

Attention is now drawn to FIGS. 10 and 11.

As shown in FIG. 10, a sensor 1000 (similar to active sensor 200, see description above with reference to FIG. 2) is operable to detect an aerial vehicle 1055 (in some embodiments, aerial vehicle 1055 is a UAV). In particular, sensor 1000 can provide data informative of the position of the aerial vehicle 1055 over time. Sensor 1000 can include and/or can communicate with a processor and memory circuitry (see processing unit 1020 and associated memory 1030), which can perform various processing tasks (see some of the operations described with respect to FIG. 11).

In some cases, position of the sensor 1000 is not known, and it is desired to determine this position.

FIG. 11 illustrates a method of determining this position.

The method includes determining (operation 1100), by the sensor 1000, data informative of the position $P_{t1}, \ldots, P_{tN}$ of an aerial vehicle (see reference 1055) relative to the sensor 1000, at various instants of time $t_1, \ldots t_N$. If N=2, then two coordinates X, Y of the sensor 1000 can be determined. If N>2, then three coordinates X, Y, Z of the sensor 1000 can be determined.

For example, if the sensor 1000 is a radar, $P_{t1}, \ldots, P_{tN}$ can correspond to various ranges (relative to the sensor) of the aerial vehicle over time. In other embodiments, $P_{t1}, \ldots, P_{tN}$ can correspond to azimuth and elevation angles of the aerial vehicle (relative to the sensor) over time, as detected by the sensor 1000. In other embodiments, $P_{t1}, \ldots, P_{tN}$ can include both ranges of the aerial vehicle and azimuth and elevation angles of the aerial vehicle over time.

The method can further include obtaining (operation 1110) data informative of the position $P'_{t1}, \ldots, P'_{tN}$ of the aerial vehicle at time $t_1, \ldots t_N$. This can include e.g. absolute position of the aerial vehicle (and not relative to the sensor). This can be measured using e.g. GPS sensor, photogrammetry (using a camera embedded on the aerial vehicle and acquiring reference points of a scene), etc.

The method can further include (operation 1120) determining position of the sensor based on $P_{t1}, \ldots, P_{tN}$ and $P'_{t1}, \ldots, P'_{tN}$. Operations 1110 and 1120 can be performed in particular by a processor and memory circuitry (see processing unit 1020 and associated memory 1030).

Based on the knowledge of the position of the aerial vehicle over time, and relative position of the aerial vehicle with respect to the radar over time (e.g. range, elevation/azimuth angles), it is possible to determine, based on an intersection of the data, position of the sensor. This position can be obtained in worldwide coordinates.

In some embodiments, operation 1120 can involve e.g. methods such as DF (direction finding), AOA (angle of arrival), RSS (radar signal strength), TDOA (time difference of arrival), FDOA (frequency difference of arrival). These examples are not limitative.

Therefore, position of the sensor can be determined.

The invention contemplates a computer program being readable by a computer for executing at least part of one or more methods of the invention. The invention further contemplates a machine-readable memory tangibly embodying a program of instructions executable by the machine for executing at least part of one or more methods of the invention.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system including a processor and memory circuitry configured to:
obtain a position $P_{aerial}$ of an aerial vehicle upon its detection at a reference axis of a sensor, or upon its detection at a predetermined or calculated angle of the reference axis of the sensor, and
determine, based at least on $P_{aerial}$ and a position $P_{sensor}$ of the sensor, a cardinal direction with respect to the reference axis of the sensor.

2. The system of claim 1, including the sensor, wherein the sensor is configured to detect that the aerial vehicle is located at its reference axis, or at a predetermined or calculated angle of its reference axis.

3. The system of claim 1, wherein the cardinal direction is a north direction.

4. The system of claim 1, configured to:
obtain a vector $V'_1$ joining $P_{aerial}$ and $P_{sensor}$ and expressed in UTM coordinates,
determine an orientation $\alpha$ of UTM north with respect to $V'_1$,
determine an orientation a of geographical north with respect to $V'_1$, based on $\alpha$, thereby determining orientation of the geographical north with respect to the reference axis.

5. The system of claim 1, configured to convert $P_{aerial}$ and $P_{sensor}$ into UTM coordinates, and determine a vector $V'_1$ joining $P_{sensor}$ to $P_{aerial}$ in UTM coordinates.

6. The system of claim 1, comprising a camera having known spatial relationship relative to the sensor and usable to detect that the aerial vehicle is located at the reference axis of the sensor, or at a predetermined angle of the reference axis of the sensor.

7. The system of claim 6, configured to:
obtain a vector $V'_1$ joining $P_{aerial}$ and $P_{sensor}$ and expressed in UTM coordinates,
determine an orientation $\alpha$ of UTM north with respect to $V'_1$,
determine an orientation $\sigma$ of geographical north with respect to $V'_1$, based on $\alpha$, thereby determining orientation of the geographical north with respect to the reference axis.

8. The system of claim 7, configured to apply a correction to $\alpha$ or to $\sigma$ to compensate a tilt between a light of sight of the camera and the reference axis of the sensor.

9. The system of claim 1, wherein the sensor is a radar or an antenna configured to:
obtain at least one first received signal sensed by a first part of the radar or antenna,
obtain at least one second received signal sensed by a second part of the radar or antenna, and
detect that the aerial vehicle is located at the reference axis of the radar or antenna based on at least the first received signal and the second received signal.

10. The system of claim 9, configured to detect that the aerial vehicle is located at the reference axis of the radar or antenna based on a detection of an extremum of a function depending at least from the first received signal and the second received signal.

11. The system of claim 1, wherein the sensor is a radar or antenna, wherein the aerial vehicle is located in a blind zone of the radar or antenna, and wherein a signal transmitted by the aerial vehicle is delayed to simulate a virtual position of the aerial vehicle out of the blind zone.

12. The system of claim 1, wherein, for a system including a plurality of sensors including at least one first sensor and at least one second sensor, the system is configured to:

detect that an aerial vehicle is located at a first reference axis of the first sensor, or at a first predetermined or calculated angle of the first reference axis of the sensor, obtain a position $P_{aerial}$ of the aerial vehicle upon its detection at the first reference axis of the first sensor, or at the first predetermined or calculated angle of the first reference axis of the first sensor, determine, at the position $P_{aerial}$ of the aerial vehicle, a deviation between the aerial vehicle and a second reference axis of the second sensor, determine, based at least on $P_{aerial}$ and a position $P_{sensor,1}$ of the first sensor, a cardinal direction with respect to the first reference axis of the first sensor, determine, based at least on $P_{aerial}$, a position $P_{sensor,2}$ of the second sensor, and said deviation, the cardinal direction with respect to the second reference axis of the second sensor.

13. The system of claim 12, wherein the first sensor is an active sensor and the second sensor is a passive sensor.

14. The system of claim 1, wherein determination of the cardinal direction is obtainable without using an inertial system.

15. The system of claim 1, wherein the aerial vehicle is a UAV or a drone.

16. The system of claim 1, wherein the reference axis includes at least one of:
  a broadside direction of the sensor;
  a boresight direction of the sensor;
  a center phase of the sensor.

17. The system of claim 1, further configured to:
  determine data $P_{t1}, \ldots P_{tN}$ informative of at least one of a relative angular position and a range of a given aerial vehicle with respect to the sensor at different instants of time, said given aerial vehicle corresponding to said aerial vehicle or to another aerial vehicle,
  obtain data $P'_{t1}, \ldots P'_{tN}$ informative of position of the given aerial vehicle at the different instants of time, and
  determine the position $P_{sensor}$ of the sensor based at least on $P_{t1}, \ldots P_{tN}$ and $P'_{t1}, \ldots P'_{tN}$.

18. A system comprising a processor and memory circuitry, wherein, for a plurality of sensors including at least one first sensor and at least one second sensor, the system is configured to:
  obtain a position $P_{aerial}$ of an aerial vehicle upon its detection at a first reference axis of the first sensor, or upon its detection at a first predetermined or calculated angle of the first reference axis of the first sensor,
  determine, at the position $P_{aerial}$ of the aerial vehicle, a deviation between the aerial vehicle and a second reference axis of the second sensor,
  determine, based at least on $P_{aerial}$ and a position $P_{sensor,1}$ of the first sensor, a cardinal direction with respect to the first reference axis of the first sensor,
  determine, based at least on $P_{aerial}$, a position $P_{sensor,2}$ of the second sensor, and said deviation, the cardinal direction with respect to the second reference axis of the second sensor.

19. A method including:
  detecting that an aerial vehicle is located at a reference axis of a sensor, or at a predetermined or calculated angle of the reference axis of the sensor,
  the method further comprising, by a processor and memory circuitry:
  obtaining a position $P_{aerial}$ of the aerial vehicle upon its detection at the reference axis of the sensor, or upon its detection at the predetermined or calculated angle of the reference axis of the sensor, and position $P_{sensor}$ of the sensor, and
  determining, based at least on $P_{aerial}$ and $P_{sensor}$, a cardinal direction with respect to the reference axis.

20. The method of claim 19, further including:
  determining, by the sensor, data $P_{t1}, \ldots P_{tN}$ informative of at least one of a relative angular position and a range of a given aerial vehicle with respect to the sensor at different instants of time, said given aerial vehicle corresponding to said aerial vehicle or to another aerial vehicle,
  the method further including, by a processor and memory circuitry:
  obtaining data $P'_{t1}, \ldots P'_{tN}$ informative of position of the given aerial vehicle at the different instants of time, and
  determining the position $P_{sensor}$ of the sensor based at least on $P_{t1}, \ldots P_{tN}$ and $P'_{t1}, \ldots P'_{tN}$.

21. A non-transitory computer readable medium comprising instructions that, when executed by one or more processing circuitries, cause the one or more processing circuitries to perform:
  obtaining a position $P_{aerial}$ of an aerial vehicle upon its detection at a reference axis of a sensor, or upon its detection at a predetermined or calculated angle of the reference axis of the sensor, and
  determining, based at least on $P_{aerial}$ and a position $P_{sensor}$ of the sensor, a cardinal direction with respect to the reference axis of the sensor.

* * * * *

UNITED STATES PATENT AND TRADEMARK OFFICE
CERTIFICATE OF CORRECTION

PATENT NO. : 12,000,922 B2
APPLICATION NO. : 17/342273
DATED : June 4, 2024
INVENTOR(S) : Josef Steinmetz It is certified that error appears in the above-identified patent and that said Letters Patent is hereby corrected as shown below:

In the Claims

In Claim 17, Column 17, Line 40, please delete "... P't1,...PtN." and insert --P't1,...P'tN.--.

Signed and Sealed this
Fifth Day of November, 2024

*Katherine Kelly Vidal*
Katherine Kelly Vidal
*Director of the United States Patent and Trademark Office*